United States Patent [19]

Gawler

[11] 4,310,087
[45] Jan. 12, 1982

[54] SINGLE REVOLUTION CLUTCHES, PARTICULARLY FOR FRANKING MACHINES

[75] Inventor: David A. Gawler, Brentwood, England

[73] Assignee: Vickers Limited, London, England

[21] Appl. No.: 124,522

[22] Filed: Feb. 25, 1980

[30] Foreign Application Priority Data

Feb. 27, 1979 [GB] United Kingdom ............... 6891/79

[51] Int. Cl.³ .................. F16D 43/26; F16D 71/00
[52] U.S. Cl. ........................... 192/142 R; 74/425; 74/435; 74/439; 192/33 R
[58] Field of Search ............... 74/112, 113, 409, 425, 74/426, 435, 424.5, 439; 192/33 R, 142 R

[56] References Cited

U.S. PATENT DOCUMENTS

| | | | |
|---|---|---|---|
| 3,067,627 | 12/1962 | Pickles | 74/425 |
| 3,661,339 | 5/1972 | Shimizu | 74/435 |
| 4,003,267 | 1/1977 | Busch | 74/435 |

FOREIGN PATENT DOCUMENTS

| | | | |
|---|---|---|---|
| 2244613 | 5/1973 | Fed. Rep. of Germany | 74/435 |
| 27201 | of 1912 | United Kingdom | 74/435 |
| 237441 | 7/1925 | United Kingdom | 74/435 |

*Primary Examiner*—Lawrence J. Staab
*Attorney, Agent, or Firm*—Shoemaker and Mattare, Ltd.

[57] ABSTRACT

A single revolution clutch in a reduction gear in a franking machine is designed to avoid fraudulent operation and double cycling and for economical production by arranging a worm to drive a split worm wheel having a gap in each arcuate row of teeth respectively on the first and second worm wheel parts. Before operation, the worm rotates in the gaps. On release by a detent of a shoulder a spring brings a tooth into mesh with the worm which rotates the first worm wheel part until a lost-motion connection is engaged bringing the second worm wheel part into mesh with the worm to drive an output shaft. The detent is released by an electrical pulse then guided by a cam track to engage the shoulder arresting the first worm wheel part while the second part continues so as to stress the spring and return to the initial position with respect to the first part.

4 Claims, 7 Drawing Figures

SINGLE REVOLUTION CLUTCHES, PARTICULARLY FOR FRANKING MACHINES

FIELD OF THE INVENTION

This invention relates to single revolution clutch mechanisms and particularly to such clutches when combined with reduction gearing.

The invention is primarily, although not exclusively, concerned with single revolution clutch mechanisms for use in franking machines in which the following requirements must be satisfied. Firstly, the cost must be kept as low as is reasonably possible. Secondly, the Post Office revenue must be secure. Therefore, it must not be possible to trip the clutch and subsequently rotate the print drum in the franking machine by hand without subsequent detection. Moreover, it must not be possible to rotate the print drum backwards. Thirdly, the machine must be reliable. Fourthly, the clutch must incorporate control means that are reset without fail during each rotation in order to prevent accidental double cycling of the machine.

SUMMARY OF THE INVENTION

According to the invention, a single revolution clutch mechanism comprises a driving gear and driven gear wheel wherein the gear wheel has a gap in its ring of teeth and is split in a plane perpendicular to its axis providing a leading toothed part rotatable relatively to a trailing toothed part connected to provide an output drive, each part having a gap in its arcuate row of teeth, the gaps corresponding to the effective length of engagement of the driving gear so that, when the clutch is disengaged, the driving gear can rotate in the gaps without driving the gear wheel, lost-motion connecting means between the two gear wheel parts whereby the leading part can initially be brought independently of the trailing part from its disengaged position into driving engagement with the driving gear to be driven thereby until the lost-motion is taken up thereupon causing the split gear wheel to be driven as a unit by the driving gear, and control means for initiating the engagement of the leading gear wheel part with the driving gear and for arresting the movement of the leading gear wheel part when the gap in its teeth again causes disengagement with the driving gear so that the trailing gear wheel part stops on completion of one revolution thereof. When the invention is applied to a franking machine or other machine in which it must not be possible to reverse the drive, i.e., to transmit torque to the input by power applied to the output, the driving gear is a suitable worm and the driven gear wheel is a split worm wheel. In order to avoid double-cycling it is advantageous for the control means to comprise a detent released for initiating the operation of the clutch, the detent being returned to its initial position towards the end of the operation by cam means.

In order that the invention may be clearly understood and readily carried into effect, mechanism in accordance therewith will now be described.

DESCRIPTION OF PREFERRED EMBODIMENT

Figure 1:
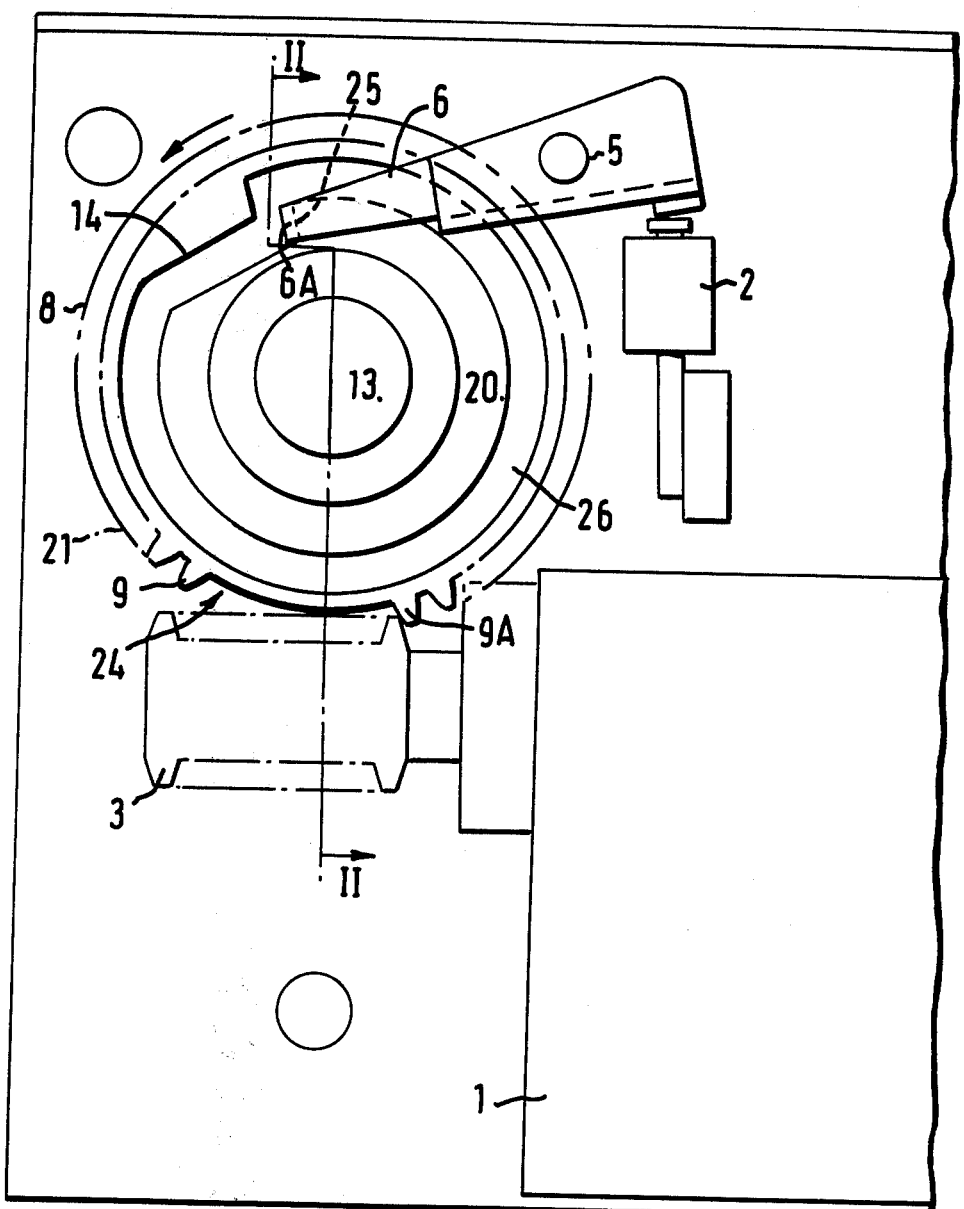
FIG. 1 is a side elevation of single revolution clutch mechanism for use in a franking machine.
Figure 2:
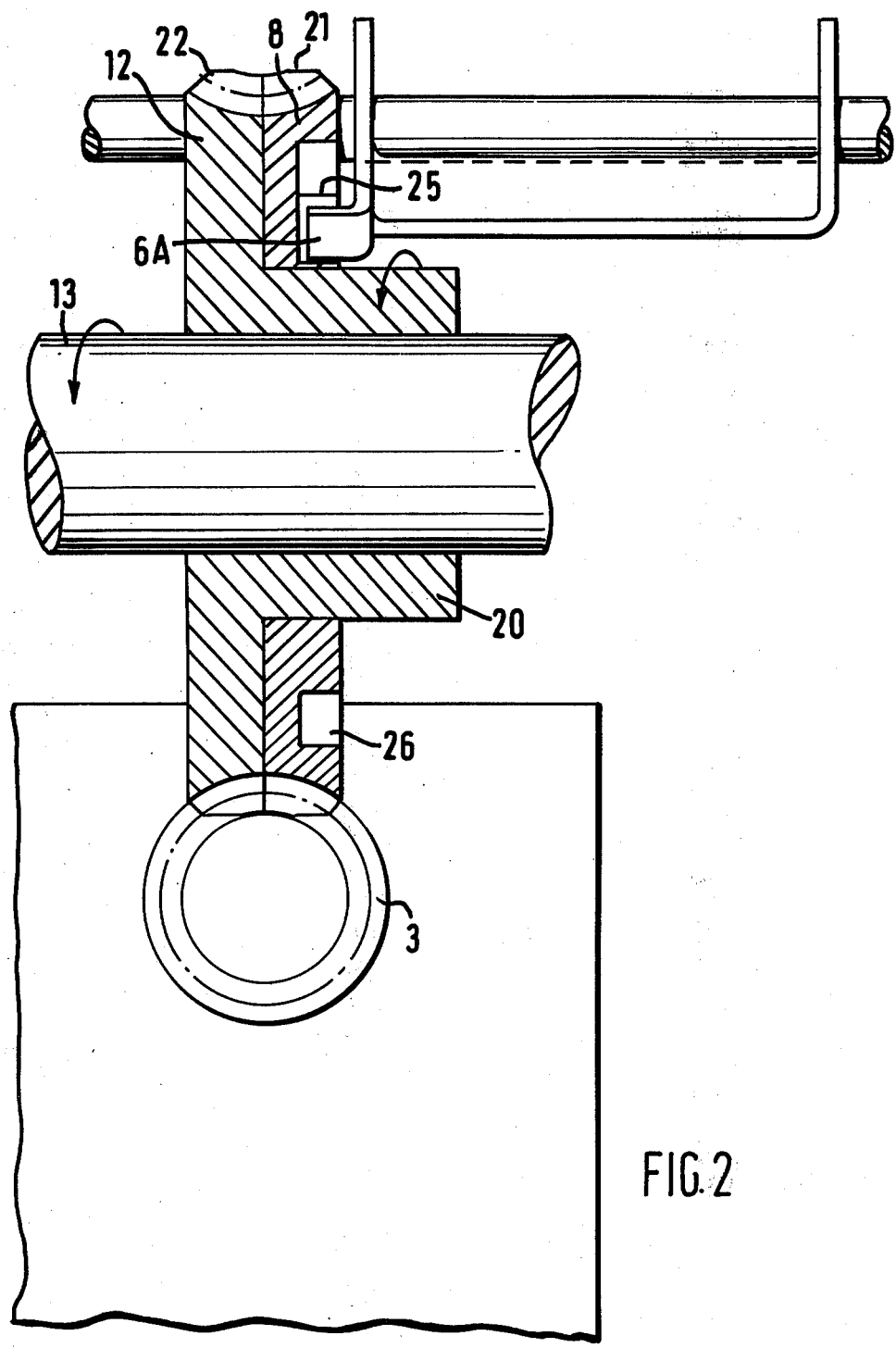
FIG. 2 is a section on the line II—II in FIG. 1.

Referring to the drawings, an output shaft 13 is arranged to be driven by a motor 1 through a single revolution clutch mechanism comprising a worm reduction gear. The motor drives a worm 3 which operates through a split worm wheel 8, 12 to turn the shaft 13 through discrete revolutions.

Figure 3:
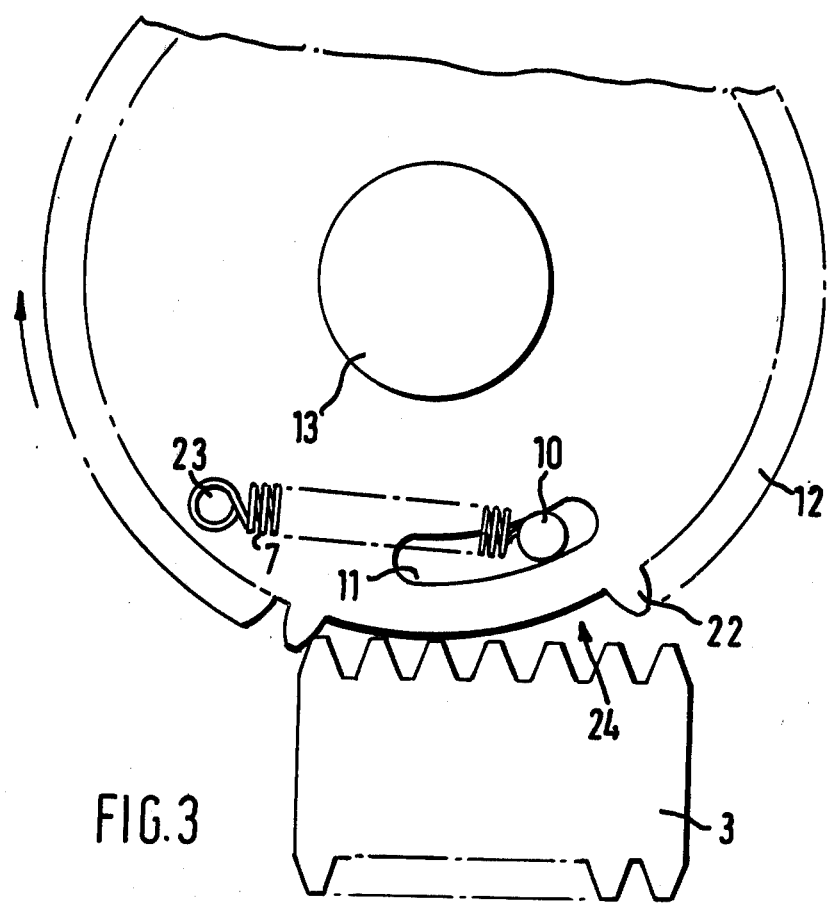
FIG. 3 is an elevation showing some details of the mechanism of FIGS. 1 and 2.
Figure 4:
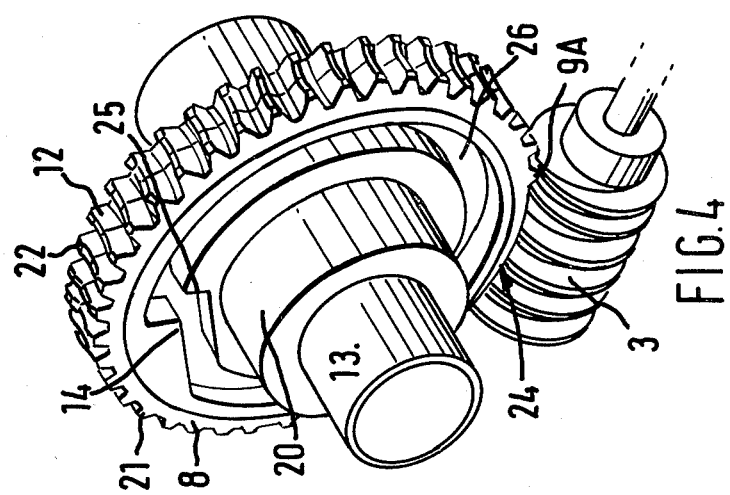
FIG. 4 is an isometric view of a portion of the mechanism of FIGS. 1 to 3.

The worm wheel is split by a plane perpendicular to its axis into two halves, namely, for reasons described below, what may be referred to as the leading half 8, and the trailing or driving half 12 on a sleeve 20 fixed to the output shaft 13, the leading half 8 being rotatably mounted on the sleeve 20. The worm wheel teeth are, therefore, split into two relatively rotatable arcuate rows 21, 22 each tooth 21 being capable of mating with any selected one of the teeth 22 to project as a unit therewith into the worm thread. However, these rows of teeth are not complete rings but constitute mutilated rings, each with a gap therein. The gaps are similar and FIGS. 1 and 4 show the gap 24 between teeth 9, 9A in the arcuate row of teeth 21 of the leading half 8 of the worm wheel. As shown in FIG. 3, this registers with the gap in the arcuate row of teeth 22 on the trailing worm wheel half 12.

A tension spring 7 (shown only in FIGS. 3 and 3A) is anchored between a pin 23 on the driving half 12 and a pin 10 on the leading half 8 of the worm wheel. The pin 10 passes through an arcuate slot 11 in the driving half 12 and with the slot 11 provides a lost-motion connection. When the gaps in the rows of teeth 21, 22 are in register with the worm 3 as shown in FIG. 3, the spring 7 is under tension for the reason firstly that the driving worm wheel half 12 is held by a detent 32 (FIG. 5) by the action of a spring loaded lever 33 engaging the edge of a notch in the edge of a disc 34 fixed to the shaft 13, and secondly because the leading worm wheel half 8 is held by a detent 6A engaging a shoulder 25 in a snail cam 26 formed by a groove in the exposed face of the leading half 8 of the worm wheel.

To operate the single revolution clutch, an electrical pulse is applied to solenoid coils 2 (FIG. 5) to swing a trip lever 6 about its axis 5. This removes the detent 6A from the shoulder 25 enabling the spring 7 to turn the leading worm wheel half to its leading position, i.e., to turn the half 8 clockwise as viewed in FIG. 3 and counterclockwise as viewed in FIG. 1. The detent 6A, therefore, enters the arcuate part of the snail cam 26 which controls its position after the electrical pulse has ceased.

Figure 3A:
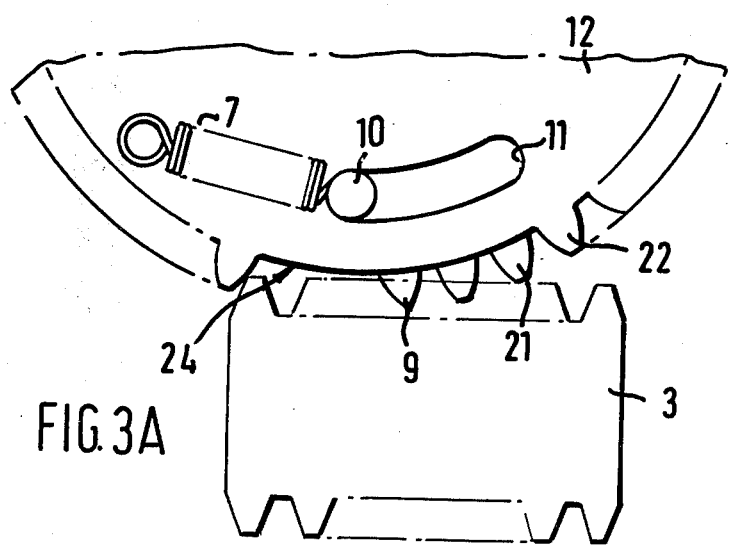
FIG. 3A shows a portion of FIG. 3 with parts in different relative positions.

This initial movement of the leading worm wheel half 8 brings the tooth 9 (FIG. 3) into mesh with the worm 3. The tooth 9 is suitably profiled for this purpose. The worm then feeds the leading worm wheel half 8 clockwise (FIG. 3) relatively to the driving or trailing half 12 until the pin 10 engages the left-hand end of the slot 11 (FIG. 3A). This pin and slot connection 10, 11 then moves the trailing half 12 clockwise to bring the tooth at the right hand end of the gap in the arcuate row of teeth 22 into mesh with the worm 3. The worm 3 now acts on both worm wheel halves 8, 12 rotating the worm wheel as a unit with the gap between teeth 9 and 9A leading the gap in the arcuate row of teeth 22.

On approaching the end of the single revolution, a straight portion 14 of the snail cam 26 guides the detent 6A into the position to engage the shoulder 25 and hold the leading worm wheel half 8. This occurs just as the gap 24 in the arcuate row of teeth 21 reaches the position of FIG. 1. However, the worm 3 continues to drive the trailing worm wheel half 12, now extending the spring 7 until the gap in the ring of teeth 22 registers with the gap 24 and the pin 10 and slot 11 have regained the relative positions shown in FIG. 3. Movement of the trailing worm wheel half 12 then also ceases.

Figure 5:
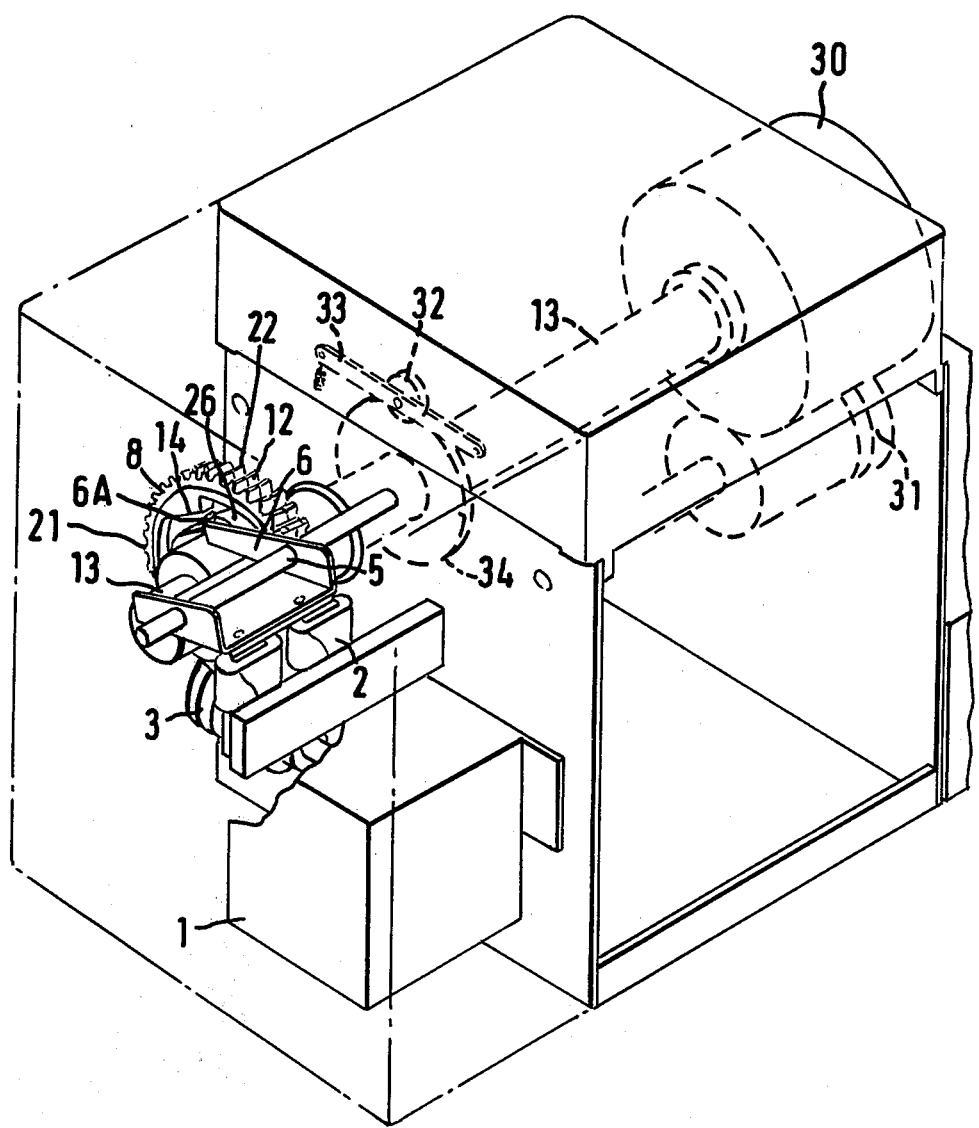
FIG. 5 is an isometric view of a portion of a franking machine incorporating the mechanism of FIGS. 1 to 4.

FIG. 5 shows the application of the single revolution clutch mechanism described above to a franking meter for a franking machine. Thus the output shaft 13 constitutes an arbor associated with mechanism for setting value printing wheels in a printing drum 30. When the printing wheels are set an electrical pulse is automatically applied to the solenoids 2 so that the drum is rotated through a complete revolution while an item of mail is fed between the drum 30 and a pressure roller 31.

While the mechanism particularly described above has proved to be satisfactory in practice, it has been found that its performance is highly sensitive to the precision with which the profile of the leading tooth 9 on the worm wheel half 8 is formed. The modified mechanism shown in FIG. 6 enables wider manufacturing tolerances to be used for the gear assembly.

Figure 6:
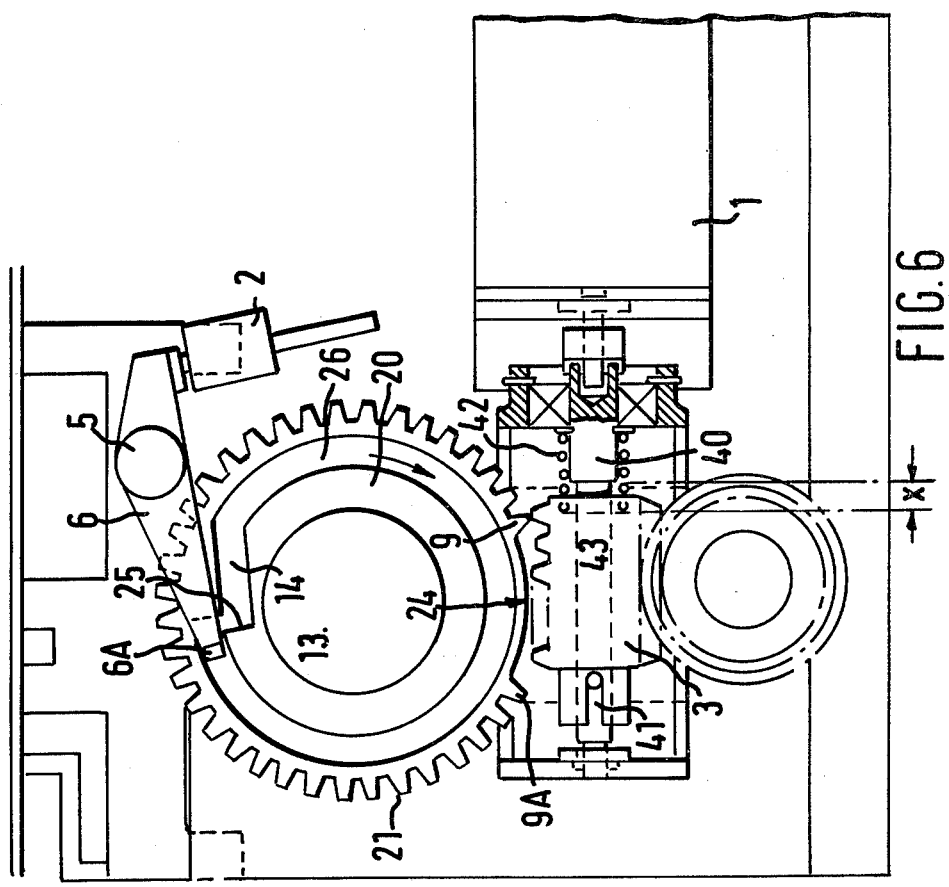
FIG. 6 is a side elevation of a modified form of the mechanism shown in FIG. 1.

In FIG. 6 the same references are used for those parts that are equivalent to similar parts appearing in the preceding figures, but it will be noted that the snail cam 26 is arranged for the worm wheel to rotate in the clockwise direction as viewed in FIG. 6.

Referring to FIG. 6, it will be seen that the worm is mounted to slide coaxially on a motor shaft 40 through a distance x substantially equal to the pitch of the worm, while the worm is being continuously rotated by means of a pin and slot connection 41. In order to prevent jamming, when a potential jamming condition arises, the tip of the profiled leading tooth 9 on the worm wheel half 8 so engages the worm as to thrust it axially while compressing a spring 42. As soon, however, as a portion 43 of the worm, which has a reduced radius, registers with the tooth 9, contact between the tip of the tooth 9 and the worm 3 is broken so that the compressed spring 42 is then free to move the worm 3 into mesh with the row of teeth 21.

It is believed that the application of this mechanism to a franking machine provides a series of advantages. For example, the cost is low compared with previous designs using multi-stage reduction gear boxes (frequently using helical gears) with separate devices and separate one-way clutches to prevent backward rotation. The present clutch mechanism combines all these features into a single worm and worm wheel speed reduction unit. The split worm wheel with its cam track may be moulded and manufactured by methods compatible with high volume and low cost.

It is impossible to rotate the worm wheel in either direction without the worm being driven in order to do this. Therefore, tripping the clutch in the franking machine can give no assistance towards obtaining fraudulent impressions as well as simplicity of operation.

Reliability results from the low number of piece parts used in the mechanism.

The fact that the trip lever 6 is released by a pulse and then controlled only by the double sided snail cam 26 avoids the risk of double cycling.

I claim:

1. A single revolution clutch mechanism comprising a motor, a driving worm gear connected to a drive shaft of said motor and mounted to rotate about a first axis, said driving worm gear being mounted for axial movement along said first axis and formed with a constant radius, constant pitch helical tooth having a portion thereof of reduced depth, a split worm wheel mounted to rotate about a second axis to be driven thereabout by said driving gear, said split worm wheel being split on a plane to which said second axis is perpendicular providing first and second worm wheel parts mounted for relative angular displacement about said second axis, said first and second worm wheel parts being formed respectively with first and second similar circumferential arcuate rows of worm wheel teeth each with a gap between the ends of the respective row of teeth to provide a common gap between said ends when said rows are circumferentially in register with one another, said driving worm gear being mounted to project into said common gap without driving either of said worm wheel parts when the clutch mechanism is disengaged but to drive said worm wheel parts when the clutch mechanism is engaged for rotation of said split worm wheel through a complete revolution, lost-motion connecting means between said two worm wheel parts whereby said first worm wheel part can initially be brought independently of said second worm wheel part from its disengaged position into driving engagement with said driving worm gear to be driven thereby alone until said lost-motion connecting means closes to provide a driving connection between said two worm wheel parts thereby causing said split worm wheel to be driven as a unit, control means for initiating said engagement of said first worm wheel part with said driving worm gear and for arresting the movement of said first worm wheel part when the gap in said first circumferential arcuate row of worm wheel teeth registers with said driving worm gear thereby disconnecting the driving connection between said driving worm gear and said first worm wheel part while said driving worm gear continues to drive said second worm wheel part, thereby opening said lost-motion connecting means until said arcuate rows of worm teeth are circumferentially in register, and an abutment member at one end of said motor and a spring interposed between said abutment and said driving worm gear, the arrangement being such that when said driving worm gear is continuously rotating and said first worm wheel part is brought into engagement with said driving gear, said driving worm gear can yield axially from a normal driving position against resilient restraint provided by said spring until said helical tooth portion of reduced height registers with the leading tooth of said first arcuate row of teeth to permit said spring to return said driving worm gear to said normal driving position.

2. A clutch mechanism according to claim 1, in which said lost-motion connecting means comprises elements respectively located on said first and second gear wheel parts and a spring biassing said elements to approach one another and in which said control means comprises first and second detents for holding said first and second gear wheel parts disengaged from said driving worm unit while said spring-loaded elements are separated, and said control means comprises also means for releasing said first detent from said first gear wheel part thereby enabling said spring to bring said first gear wheel part into driving engagement with said worm unit, said first detent being arranged to arrest said first gear wheel part after one revolution thereof while said worm unit drives said second gear wheel part to the completion of one revolution whereat said second gear wheel part is held by said second detent.

3. A clutch mechanism according to claim 2, in which said first gear wheel part comprises an eccentric shoulder on the side thereof remote from said second gear wheel part, said first detent being arranged to engage said shoulder and release it under the action of said control means to initiate the operation of said mechanism and said first gear wheel part being formed with a cam groove shaped to lead said first detent to a position for re-engaging said shoulder on completion of a revolution of said first gear wheel part.

4. A franking machine comprising a motor, a printing drum arranged to make a single revolution in each franking operation of the machine, and a single revolution clutch mechanism according to claim 1, for providing a driving connection between said motor and said drum.

* * * * *